United States Patent
Dutson

Patent Number: 5,927,146
Date of Patent: Jul. 27, 1999

[54] SYSTEM AND METHOD FOR PREVENTING GEAR HOPOUT IN A COMPOUND TRANSMISSION

[75] Inventor: Brian Dutson, Astley Tyldesley, United Kingdom

[73] Assignee: Eaton Corporation, Cleveland, Ohio

[21] Appl. No.: 08/878,954

[22] Filed: Jun. 19, 1997

[30] Foreign Application Priority Data

Jun. 19, 1996 [GB] United Kingdom .................... 9612778

[51] Int. Cl.⁶ .................................................... F16H 3/08
[52] U.S. Cl. ................................ 74/333; 74/325; 74/339; 192/53.34
[58] Field of Search .............................. 74/325, 333, 335, 74/339; 192/53.34, 53.341

[56] References Cited

U.S. PATENT DOCUMENTS

| | | | |
|---|---|---|---|
| 4,273,003 | 6/1981 | Schultz | 74/467 |
| 4,987,790 | 1/1991 | Weismann | 74/333 |
| 5,105,674 | 4/1992 | Rea et al. | 74/333 |
| 5,178,250 | 1/1993 | Ashikawa et al. | 74/333 X |
| 5,207,768 | 5/1993 | Gluys | 74/331 |
| 5,400,669 | 3/1995 | Lamela | 74/333 |
| 5,425,437 | 6/1995 | Nellums | 192/53.34 |
| 5,557,980 | 9/1996 | Mastroianni et al. | 74/443 |
| 5,588,516 | 12/1996 | Braun et al. | 74/339 X |
| 5,641,045 | 6/1997 | Ogawa et al. | 192/53.341 |
| 5,651,435 | 7/1997 | Perosky et al. | 74/339 X |
| 5,738,194 | 4/1998 | Hughes | 192/53.34 |

*Primary Examiner*—Dirk Wright
*Assistant Examiner*—Peter T. Kwon
*Attorney, Agent, or Firm*—Brooks & Kushman P.C.

[57] ABSTRACT

A compound transmission assembly is provided including a splitter gear and headset/fourth gear, both mounted on the input shaft. The splitter gear is provided with a minimal diametral float with respect to the input shaft in order to minimize splitter gear tipping while allowing substantially balanced torque splitting between opposing countershafts. The headset/fourth gear is mounted to the input shaft via a pair of oppositely tapered roller bearing sets disposed about the input shaft in order to prevent headset/fourth gear tipping. In this manner, gear hopout is prevented during PTO operation, and substantially balanced torque splitting is accomplished.

12 Claims, 5 Drawing Sheets

SYSTEM AND METHOD FOR PREVENTING GEAR HOPOUT IN A COMPOUND TRANSMISSION

TECHNICAL FIELD

The present invention relates to compound vehicle transmissions, and more particularly to a system for preventing gear hopout during "power take off" (PTO) operation in a compound transmission.

BACKGROUND ART

Compound change gear transmissions are typically associated with heavy duty vehicles such as large trucks, tractor/semi-trailers, and the like. Compound transmissions comprise main and auxiliary transmission sections connected in series, and provide a total number of available transmission ratios equal to the product of the main and auxiliary section ratios. By way of example, a compound change gear transmission comprising a four (4) speed main section connected in series with a four (4) speed auxiliary section will provide sixteen (4×4=16) available ratios.

Power is transmitted from the engine, through the master clutch and into the transmission via the input shaft. In "Fuller" transmissions, a gear is splined to the input shaft (namely the headset gear) which is permanently enmeshed with two countershaft gears situated 180° apart on the periphery of the headset gear. Torque is transmitted to the countershaft gears and subsequently through the countershafts. The countershafts generally include a number of gears which mate with mainshaft gears which are placed along the same axis of the input shaft, free to float on a floating mainshaft. Clutches are provided between the mainshaft and the mainshaft gears to provide progressive ratios. By moving a clutch from its neutral position to an engaged position, torque is transmitted from the countershafts, into the mainshaft gear, through the clutch and into the mainshaft. This method splits the input torque equally between the countershafts and brings the geared torque back into the mainshaft gear, again split equally.

For the torque to be split equally and effectively, it is important that the mainshaft, mainshaft gears, and clutches are able to float to assume centered positions. It is not necessary to firmly fix the mainshaft gears and mainshaft, as is common practice with single layshaft transmissions, since the separating and tangential forces generated at the gear teeth are equal and opposite and therefore cancel each other out. In fact, fixing the mainshaft/input shaft gears can be detrimental and produce a torque imbalance because it is impossible to manufacture the geartrain perfectly, i.e., to absolute sizes without tolerance. The manufactured tolerances can result in the gear teeth of the mainshaft and input shaft gears being more heavily loaded on one side than the other, and consequently, the gears on one countershaft are loaded more than on the other. Furthermore, this can give rise to gear tipping problems and, in extreme cases, gear hopout during normal driving conditions.

In a single layshaft, medium-duty transmission, torque is supplied into the transmission via the input shaft through the headset gear, and is passed from the headset gear to a mating layshaft gear, and into the single layshaft. In this case, the mainshaft is simply supported with bearings with very little radial clearance. The mainshaft gears are held concentric with the mainshaft on needle roller bearings. This is necessary due to the high tangential and separating forces set up between the two mating gears which must be reacted through rolling elements into the transmission housing.

Compound transmissions are sometimes used for "power take off" (PTO) operation in which torque is transmitted from one of the countershafts to an ancillary unit, such as a pump or flange device for operating a truck bed lifter, etc. The headset gear of a conventional Fuller twin countershaft transmission is splined to the input shaft with a small diametral float, and when a PTO is fitted to the drive from the front countershaft, the transmission is utilized in a single layshaft manner. The headset gear or mainshaft gears are not coupled to the mainshaft, hence no torque split. The headset gear drives torque through one countershaft only. Since the headset gear is not coupled with the clutch, there cannot be any gear hopout. The small diametral clearance ensures that the headset gear runs concentric with the input shaft and the large drive splines are strong enough to sustain the load cycles during PTO operation.

In certain designs, the splitter is configured such that the headset gear, which is usually mounted on the input shaft via a spline, can be free to rotate and float, and performs the low split function (on an overdrive transmission) as well as the fourth gear function. This gear is mounted on a spindle which is screwed into the mainshaft. The headset gear bore includes a clearance fit to the spindle so that it may float under normal driving operation to ensure a balanced torque split. It is also supported axially by cylindrical thrust roller bearings which compensate for the axial thrust forces apparent during normal operation due to the helical gearing, which is not balanced. These forces are accompanied by a differential rotation between the headset gear and spindle when the low split gear is selected (i.e., when it is a driving gear), hence the need for thrust bearings. A splitter gear is then placed on the input shaft, forward of the headset/fourth gear with a plain clearance bore to the input shaft which provides a high split function. These two gears are then selectable using a splitter clutch splined to the input shaft and free to slide along the spline to supply the clutching function.

This design is operational for normal driving conditions, however, when these two gears are used for PTO operation, there is a tendency for the clutch to hopout of engagement. In essence, the reason for this hopout condition, both at high and low split, is due to the fact that the transmission is being used as a single layshaft transmission without bearings under the driving gear.

The hopout can be attributed to inadequate parallelism and concentricity between the selected splitter or headset gear, splitter clutch and shaft on which the gear is situated. The gear becomes displaced radially taking up the clearance between the gear bore and shaft at the high split position, and similarly at the low split position but with the added clearance that exists due to the floating nature of the mainshaft and spindle. This results in a tipping affect.

The need exists for providing such torque splitting options, while also providing the availability of PTO operation corresponding with both the splitter gear and the headset/fourth gear. It is necessary to provide gear float for balanced torque splitting, however, unfortunately, this float allows greater gear tipping, particularly during PTO operation, which increases the likelihood of gear hopout at the splitter clutch.

It is desirable to provide a compound transmission design which provides substantially balanced torque splitting, with the availability of PTO operation corresponding with both the splitter gear and headset/fourth gear without increasing the risk of gear hopout during PTO operation.

DISCLOSURE OF THE INVENTION

The present invention overcomes the above-referenced shortcomings of prior art compound transmission assemblies by providing a compound transmission which includes a splitter gear and headset/fourth gear, both mounted on the input shaft. The splitter gear is provided with a minimal diametral float of between about 0.005 and 0.020 inches with respect to the input shaft in order to minimize splitter gear tipping while allowing substantially balanced torque splitting, and the headset/fourth gear is mounted to the input shaft via a pair of oppositely tapered roller bearing sets disposed about the input shaft to minimize headset/fourth gear tipping. In this manner, gear hopout is prevented during PTO operation, and substantially balanced torque splitting is accomplished.

More specifically, the present invention provides a compound transmission assembly with reduced gear hopout, including an input shaft disposed along a central axis, a floating mainshaft disposed substantially along the central axis adjacent the input shaft, an auxiliary section adjacent the mainshaft, and at least one countershaft parallel with and spaced from the central axis, said countershaft being operative to transmit input shaft torque to the mainshaft and to facilitate PTO operation. The assembly further comprises a splitter gear disposed on the input shaft and having a central bore formed therethrough with a minimal diametral clearance of between about 0.005 and 0.020 inches with respect to the input shaft to minimize gear tipping, and a sufficient diametral clearance for load-sharing balance. A synchronizer is disposed about the input shaft adjacent the splitter gear and includes a clutch spline. A pair of oppositely tapered roller bearing sets are disposed about the input shaft adjacent the synchronizer. A headset gear is rotatably mounted on the pair of oppositely tapered roller bearing sets for minimizing gear tipping during PTO operation. The synchronizer clutch spline is selectively engageable with one of the splitter gear and the headset gear, and the likelihood of gear hopout of either gear with respect to the clutch spline during PTO operation is reduced.

A method of eliminating gear hopout during PTO operation in a compound transmission assembly is also provided. The method comprises: (1) providing a splitter gear on the input shaft with a minimal diametral clearance with respect to the input shaft to minimize splitter gear tipping; (2) providing a pair of oppositely tapered roller bearing sets on the input shaft; and (3) mounting a headset gear on the pair of oppositely tapered roller bearing sets to minimize headset gear tipping.

Accordingly, an object of the present invention is to provide a compound transmission assembly with substantially balanced torque splitting capability with low split and high split operations available while reducing the likelihood of gear hopout during PTO operation.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
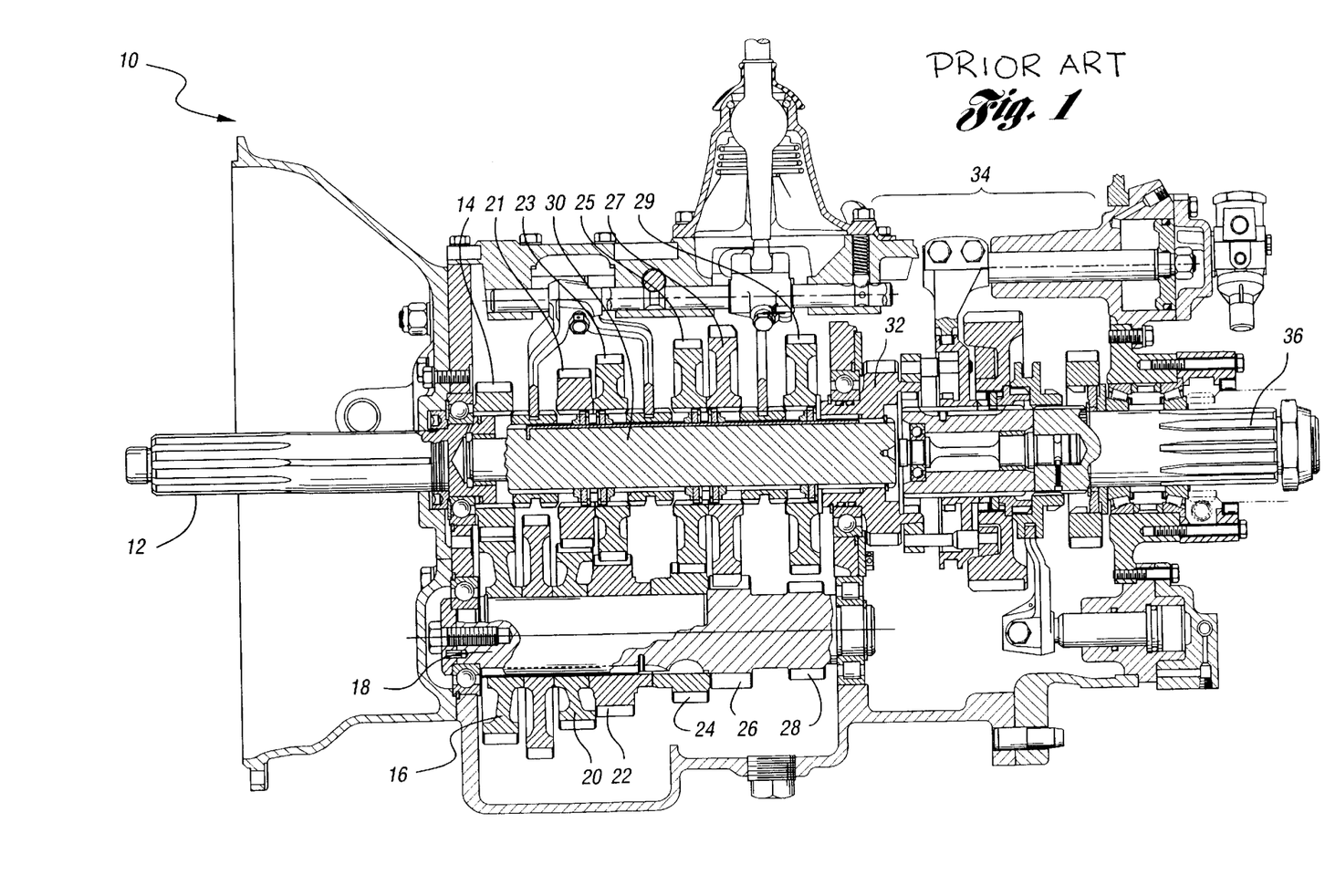
FIG. 1 shows a vertical cross-section of a prior art "Fuller" twin countershaft compound change transmission.

FIG. 1 shows a sectional view of a prior art "Fuller" twin countershaft compound change transmission assembly 10. This typical twin countershaft assembly includes an input shaft 12 which carries torque from the engine into the transmission. The input shaft 12 drives the headset gear 14, which is splined to the input shaft 12, and also permanently enmeshed with opposing countershaft gears 16. The countershaft 18 includes a series of gears 20, 22, 24, 26 and 28 which mate with corresponding mainshaft gears 21, 23, 25, 27 and 29 which are placed along the same axis as the input shaft, free to float on a floating mainshaft 30. Clutches are provided between the mainshaft 30 and the mainshaft gears to provide progressive ratios. Torque then is transmitted from the mainshaft through the auxiliary drive gear 32, and into the auxiliary section 34, and finally through the output shaft 36.

The present invention, as shown in FIGS. 2–7, provides such a compound transmission design with substantially balanced torque splitting, while also providing the availability of PTO operation corresponding with both the splitter gear and the headset/fourth gear without increasing the risk of gear hopout during PTO operation.

Figure 2:
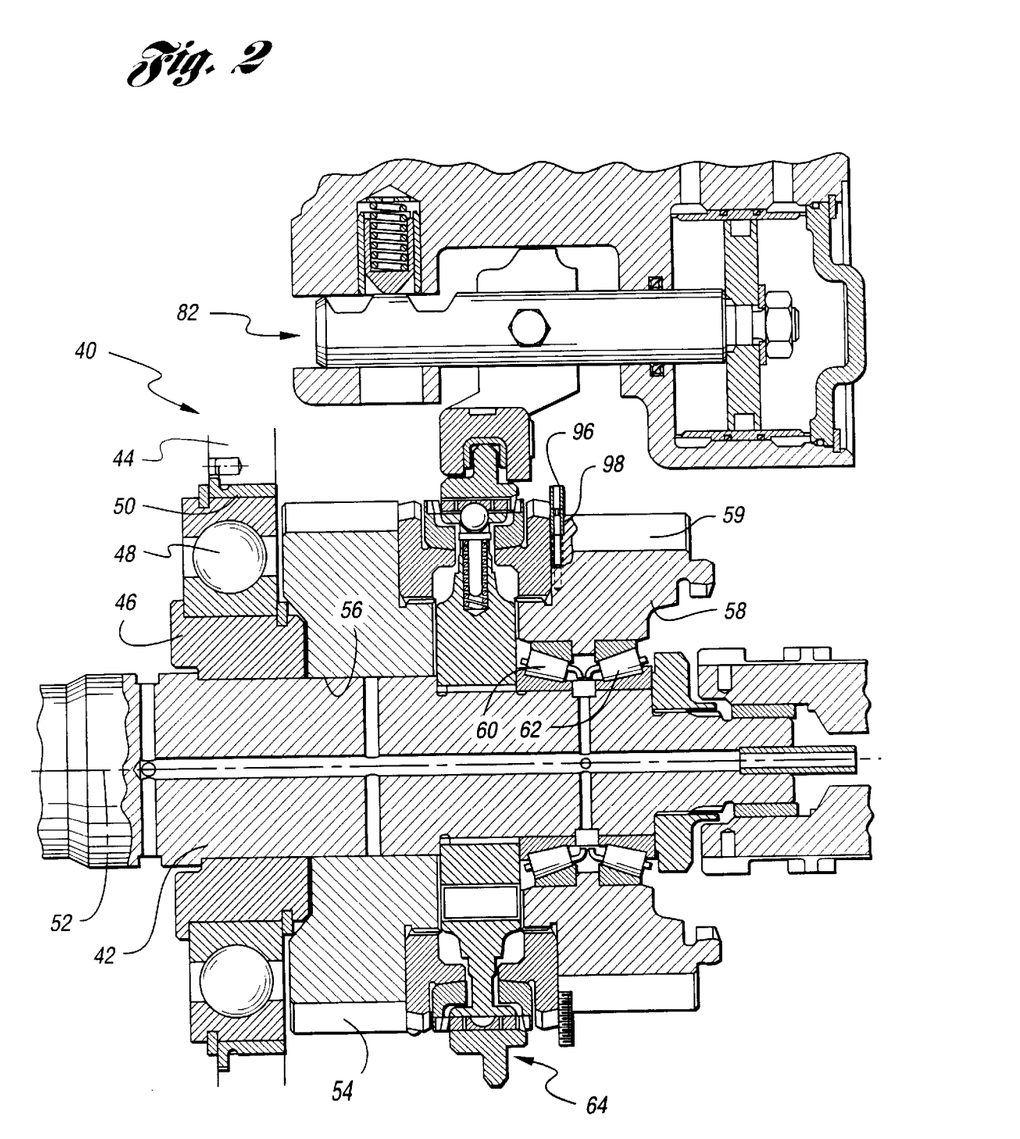
FIG. 2 shows an enlarged partial cross-sectional view of a compound transmission assembly in accordance with the present invention.
Figure 3:
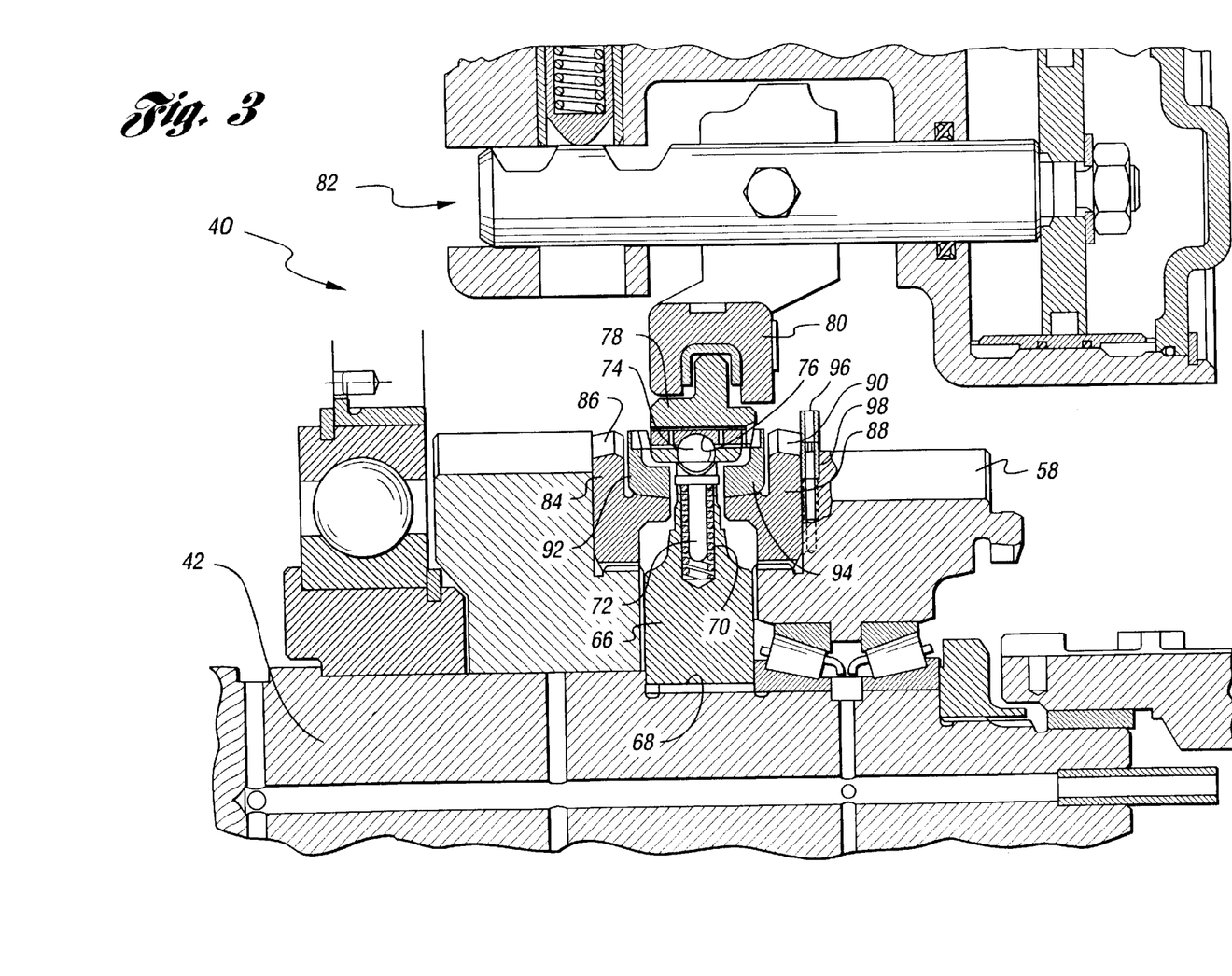
FIG. 3 shows an enlarged sectional view of the transmission shown in FIG. 2.
Figure 4:
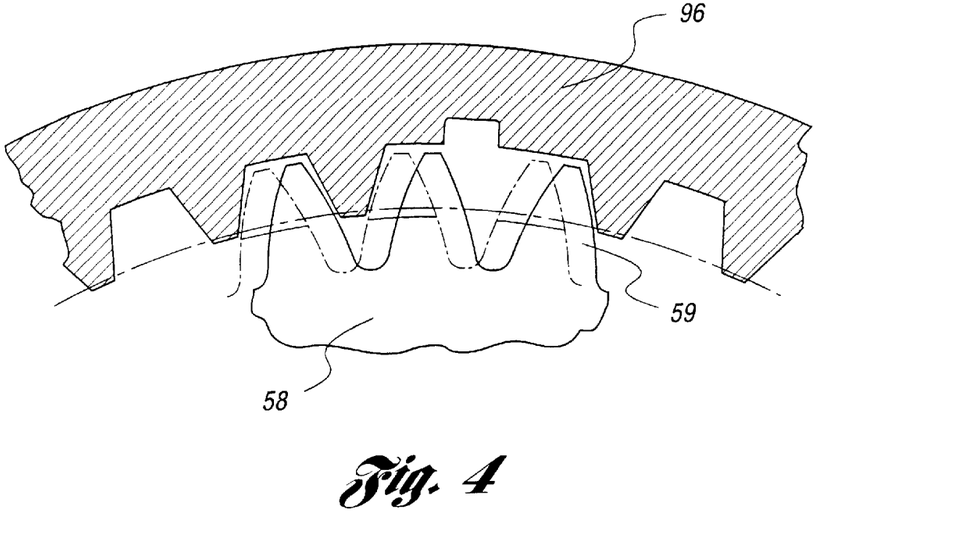
FIG. 4 shows a cut-away sectional view of a washer and headset gear in accordance with the embodiment shown in FIG. 2.

Referring to FIGS. 2–3, a compound change gear transmission assembly 40 is shown in accordance with the present invention. The assembly 40 includes an input shaft 42 which carries torque into the assembly. The input shaft 42 is supported within the transmission housing 44 by a spacer 46 which is rotatably supported with respect to the housing 44 by an input bearing 48 which is secured to a sleeve 50.

The input shaft 43 is disposed along a central axis 52. A splitter gear 54 is disposed on the input shaft adjacent the spacer 46. The splitter gear has a central bore 56 formed therethrough with a minimal diametral clearance (preferably between about 0.005 and 0.020 inches with respect to the input shaft in order to minimize splitter gear tipping. This minimal diametral clearance provides sufficient float in order to maintain a substantially balanced torque split between opposing countershafts when the splitter gear 54 is operated in a high split mode. The diametral clearance provides a range of approximately a 40%–60% and 60%–40% torque split between opposing countershafts. This differential does not create a significant balance problem because excess torque on one countershaft is reacted by bearings and support structure in the assembly. In order to prevent further load-sharing or torque split imbalance, a sufficient diametral clearance is maintained.

Further rearward on the input shaft 42, a headset/fourth gear 58 is mounted on the input shaft 42 by means of a pair of oppositely tapered roller bearing sets 60,62, which are mounted on the input shaft. These oppositely tapered roller bearing sets 60,62 minimize headset/fourth gear 58 tipping.

Accordingly, the present invention effectively minimizes tipping of either the splitter gear 54 or headset/fourth gear 58 when operating in the high split or low split PTO mode of operation, respectively, and concentricity and parallelism are maintained with respect to the clutch. Because concentricity and parallelism of the splitter gear 54 and headset/fourth gear 58 with respect to the clutch are maintained, these gears are less likely to "hopout" of engagement with the sliding sleeve/clutch 78.

The splitter gear 54 or headset/fourth gear 58 may be selectively engaged with the input shaft 42 by means of the baulk ring synchronizer assembly 64. This type of baulk ring synchronizer 64 is fully described in U.S. Pat. No. 5,425,437 to Eaton Corporation, herein incorporated by reference. Although this synchronizer is preferred, other synchronizer designs would be compatible with the present invention.

The synchronizer 64 includes a fixed hub 66 secured to the splines 68 of the input shaft 42. Pre-energizer springs 70 preload the guide pins 72 and rollers 74 against an annular groove 76 formed in the sliding sleeve 78. The sliding sleeve 78 may be slid by the shift fork 80 by means of the shifting assembly 82 for selectively engaging the clutch 78 with either the splitter gear 54 or the headset/fourth gear 58. The splitter gear includes a synchro flange 84 splined thereto which includes gear teeth 86 which are engageable with the sliding clutch 78. Similarly, the headset/fourth gear 58 includes a synchro flange 88 splined thereto and including gear teeth 90 which are similarly engageable with the sliding clutch 78. Synchro rings 92,94 are frictionally engageable with the respective synchro flanges 84,88 in order to frictionally synchronize rotational speed between the fixed hub 66 and the splitter gear 54 or headset/fourth gear 58. The synchro rings 92,94 also act as blockers to prevent movement of the sliding sleeve/clutch 78 toward their respective synchro flange 84,88 until the respective synchro flange 84,88 is brought up to speed with the fixed hub 66 to allow engagement of the clutch 78 with the respective synchro flange.

Figure 5:
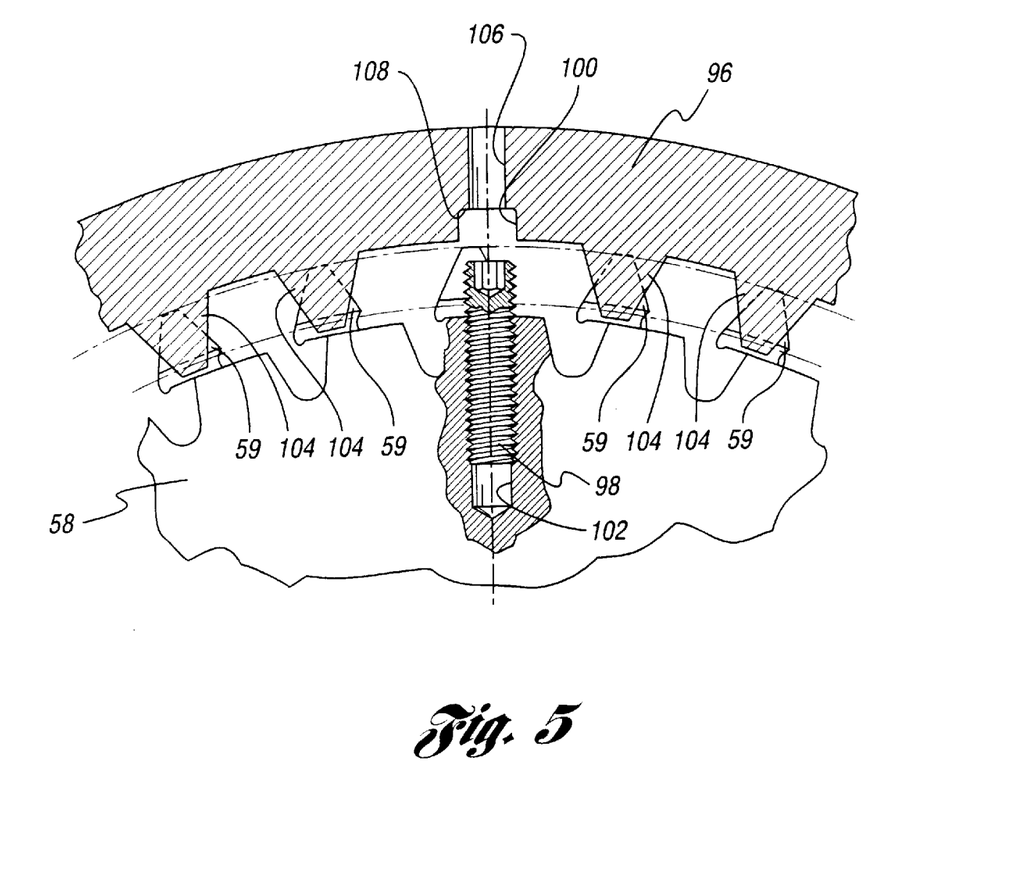
FIG. 5 shows an enlarged partially cut-away sectional view of a washer, headset gear, and attachment screw in accordance with the embodiment shown in FIG. 2.
Figure 6:
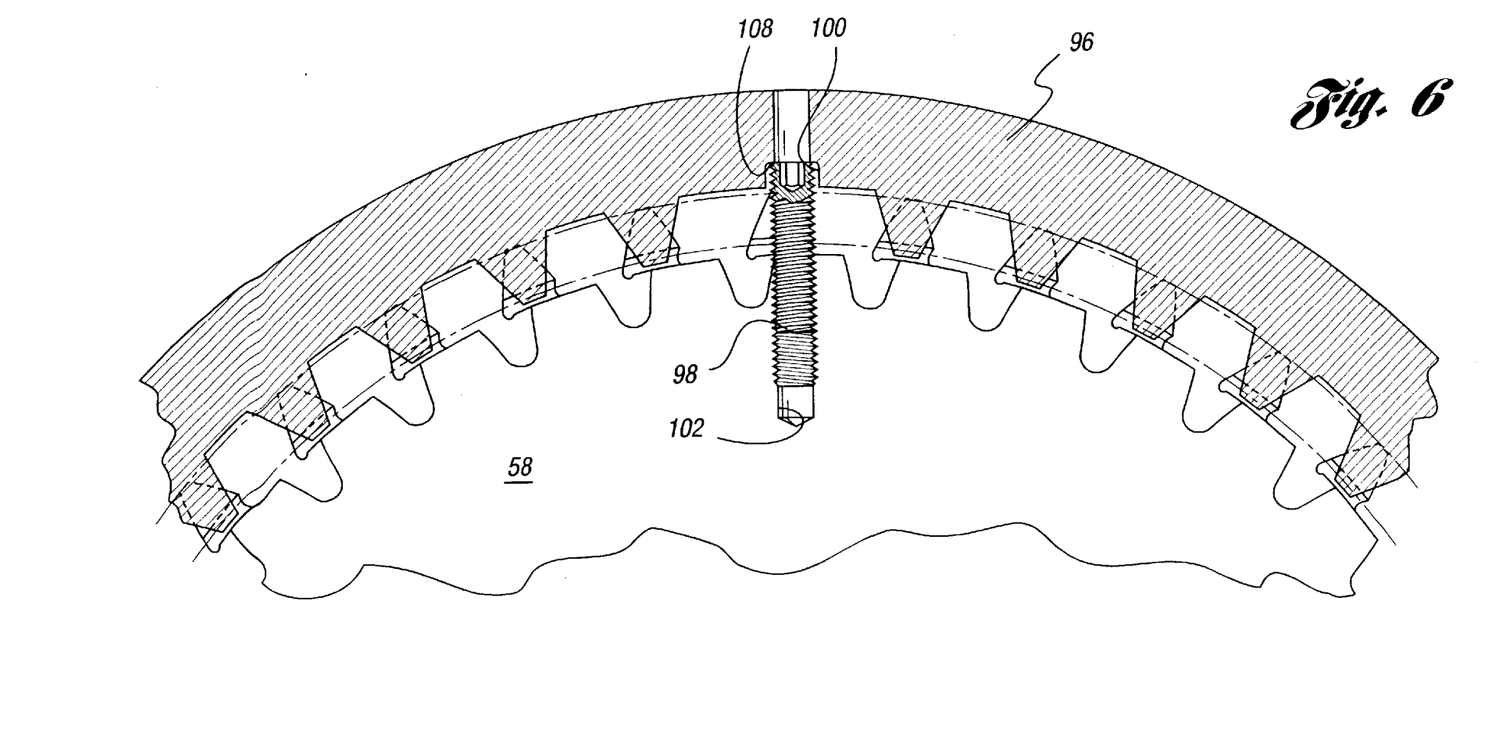
FIG. 6 shows an enlarged partially cut-away sectional view of a washer, headset gear, and attachment screw in accordance with the embodiment shown in FIG. 2.
Figure 7:
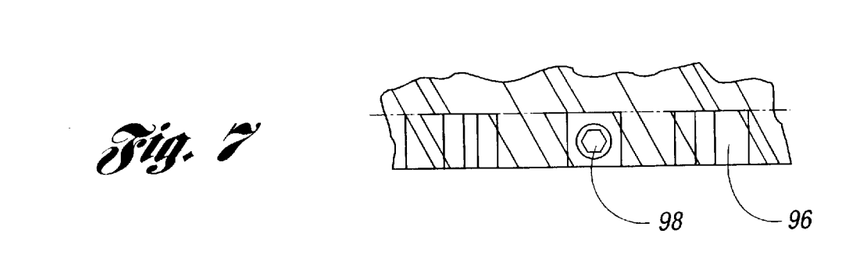
FIG. 7 shows a cut-away sectional plan view of the assembly shown in FIG. 6.

Sliding movement of the sliding sleeve/clutch 78 is limited in the direction of the headset/fourth gear 58 by the washer 96 and set screw 98, as shown in FIGS. 2–6. In assembly, once the sleeve 78 is in place, the washer 96 can be pushed over the headset gear teeth 59 and indexed until the two radial holes 100 in the washer 96 align with the two set screws 98, which are screwed into the set screw holes 102 formed in the headset/fourth gear 58. In this position, the splines 104 of the washer 96 are in alignment with the gear teeth 59 of the headset/fourth gear 58 in order to act as a positive stop, as shown in FIG. 5. In this position, a suitable hexagon wrench can be inserted through the radial access openings 106 formed in the washer 96 in order to unscrew the set screw 98 until the set screw 98 is seated in the screw seats 108 formed in the washer 96. This configuration alleviates a problem faced in many transmissions in which the screws have a tendency to work themselves loose due to vibrations and with the presence of centrifugal force, unscrew, and can enter the meshing gear teeth and cause damage. With this design, the set screws 98 must overcome centrifugal force to screw themselves into the gear 58, which is very unlikely.

While the best mode for carrying out the invention has been described in detail, those familiar with the art to which this invention relates will recognize various alternative designs and embodiments for practicing the invention within the scope of the appended claims.

What is claimed is:

1. A compound transmission assembly with reduced gear hopout, including an input shaft disposed along a central axis, a floating mainshaft disposed substantially along the central axis adjacent the input shaft, an auxiliary section adjacent the mainshaft, and at least one countershaft parallel with and spaced from the central axis, said countershaft being operative to transmit input shaft torque to the mainshaft and to facilitate power take off (PTO) operation, the assembly further comprising:

a splitter gear disposed on the input shaft and having a central bore formed therethrough with a minimal diametral clearance of between about 0.005 and 0.020 inches with respect to the input shaft to minimize splitter gear tipping;

a synchronizer disposed about the input shaft adjacent the splitter gear and having a clutch spline;

a pair of oppositely tapered roller bearing sets disposed about said input shaft adjacent said synchronizer;

a headset gear rotatably mounted on said pair of oppositely tapered roller bearing sets for minimizing gear tipping during PTO operation; and wherein said synchronizer clutch spline is selectively engageable with one of said splitter gear and said headset gear, and likelihood of gear hopout of either said gear with respect to the clutch spline during PTO operation is reduced.

2. The transmission of claim 1, wherein one of said pair of oppositely tapered roller bearing sets includes a first group of roller bearings having central axes of rotation collectively defining a cone opening in a first direction, and the other of said pair of oppositely tapered roller bearing sets includes a second group of roller bearings having central axes of rotation collectively defining a cone opening in a direction opposite said first direction.

3. The transmission assembly of claim 1, wherein said synchronizer comprises a baulk ring synchronizer, including:

first and second synchro flanges secured to the splitter gear and headset gear, respectively;

first and second blocking rings frictionally engageable with said first and second synchro flanges, respectively;

a fixed hub secured to the input shaft; and said clutch spline being axially shiftable and rotatable with said fixed hub, and selectively engageable with either said splitter gear or said headset gear, and including a sliding sleeve.

4. The transmission assembly of claim 3, wherein said headset gear comprises a set screw hole formed therein, the assembly further comprising:

a set screw cooperating with the set screw hole; and a stop washer disposed about the headset gear and having an aperture formed therein for cooperation with said set screw, said stop washer further having a plurality of spline teeth for alignment with the teeth of said headset gear to provide a positive stop, and said stop washer being engageable with said sliding sleeve to limit movement of the sleeve.

5. The transmission assembly of claim 4, wherein said stop washer comprises a radial access opening for access to said set screw, and a screw seat for receiving said set screw when unscrewed.

6. A compound transmission assembly with reduced gear hopout, including an input shaft disposed along a central axis, a floating mainshaft disposed substantially along the mainshaft, an auxiliary section adjacent the mainshaft, and at least one countershaft parallel with and spaced from the central axis, said countershaft being operative to transmit input shaft torque to the mainshaft and to facilitate power take off (PTO) operation, the assembly further comprising:

a splitter gear disposed about the input shaft and having a central bore formed therethrough with a minimal diametral clearance of between about 0.005 and 0.020 inches with respect to the input shaft to minimize gear tipping;

a baulk ring synchronizer disposed about the input shaft adjacent the splitter gear and having a clutch spline;

a pair of oppositely tapered roller bearing sets disposed about said input shaft adjacent said synchronizer;

a headset gear rotatably mounted on said pair of oppositely tapered roller bearing sets for minimizing gear tipping during PTO operation; and wherein said synchronizer clutch spline is selectively engageable with one of said splitter gear and said headset gear, and likelihood of gear hopout of either said gear with respect to the clutch spline is reduced.

7. The transmission of claim 6, wherein one of said pair of oppositely tapered roller bearing sets includes a first group of roller bearings having central axes of rotation collectively defining a cone opening in a first direction, and the other of said pair of oppositely tapered roller bearing sets includes a second group of roller bearings having central axes of rotation collectively defining a cone opening in a direction opposite said first direction.

8. The transmission assembly of claim 7, wherein said baulk ring synchronizer comprises:

first and second synchro flanges secured to the splitter gear and headset gear, respectively;

first and second blocking rings frictionally engageable with said first and second synchro flanges, respectively;

a fixed hub secured to the input shaft; and said clutch spline being axially shiftable and rotatable with said fixed hub, and selectively engageable with either said splitter gear or said headset gear, and including a sliding sleeve.

9. The transmission assembly of claim 6, wherein said headset gear comprises a set screw hole formed therein, the assembly further comprising:

a set screw cooperating with the set screw hole; and a stop washer disposed about the headset gear and having an aperture formed therein for cooperation with said set screw, said stop washer further having a plurality of spline teeth for alignment with the teeth of said headset gear to provide a positive stop, and said stop washer being engageable with said sliding sleeve to limit movement of the sleeve.

10. The transmission assembly of claim 9, wherein said stop washer comprises a radial access opening for access to said set screw, and a screw seat for receiving said set screw when unscrewed.

11. The transmission assembly of claim 6, wherein said central bore has a sufficient diametral clearance with respect to the input shaft to maintain a substantially balanced load sharing.

12. A method of eliminating gear hopout during power take off (PTO) operation in a compound transmission assembly including an input shaft disposed along a central axis, a floating mainshaft disposed substantially along the central axis adjacent the input shaft, an auxiliary section adjacent the mainshaft, and at least one countershaft parallel with and spaced from the central axis, said countershaft being operative to transmit input shaft torque to the mainshaft and to facilitate PTO operation, the method comprising:

providing a splitter gear on the input shaft with a minimal diametral clearance of between about 0.005 and 0.020 inches with respect to the input shaft to minimize splitter gear ripping;

providing a pair of oppositely tapered roller bearing sets on the input shaft; and mounting a headset gear on the pair of oppositely tapered roller bearing sets to minimize headset gear tipping.

* * * * *

UNITED STATES PATENT AND TRADEMARK OFFICE
CERTIFICATE OF CORRECTION

PATENT NO : 5,927,146
DATED : July 27, 1999
INVENTOR(S) : Brian Dutson

It is certified that error appears in the above-identified patent and that said Letters Patent is hereby corrected as shown below:

Column 8, line 31 (Claim 12), after "gear" replace "ripping" with – tipping –

Signed and Sealed this

Twenty-ninth Day of February, 2000

Attest:

Q. TODD DICKINSON

Attesting Officer

Commissioner of Patents and Trademarks